May 13, 1930.  E. J. BURGER ET AL  1,758,781
PRESSURE APPLYING TOOL
Filed Jan. 19, 1928
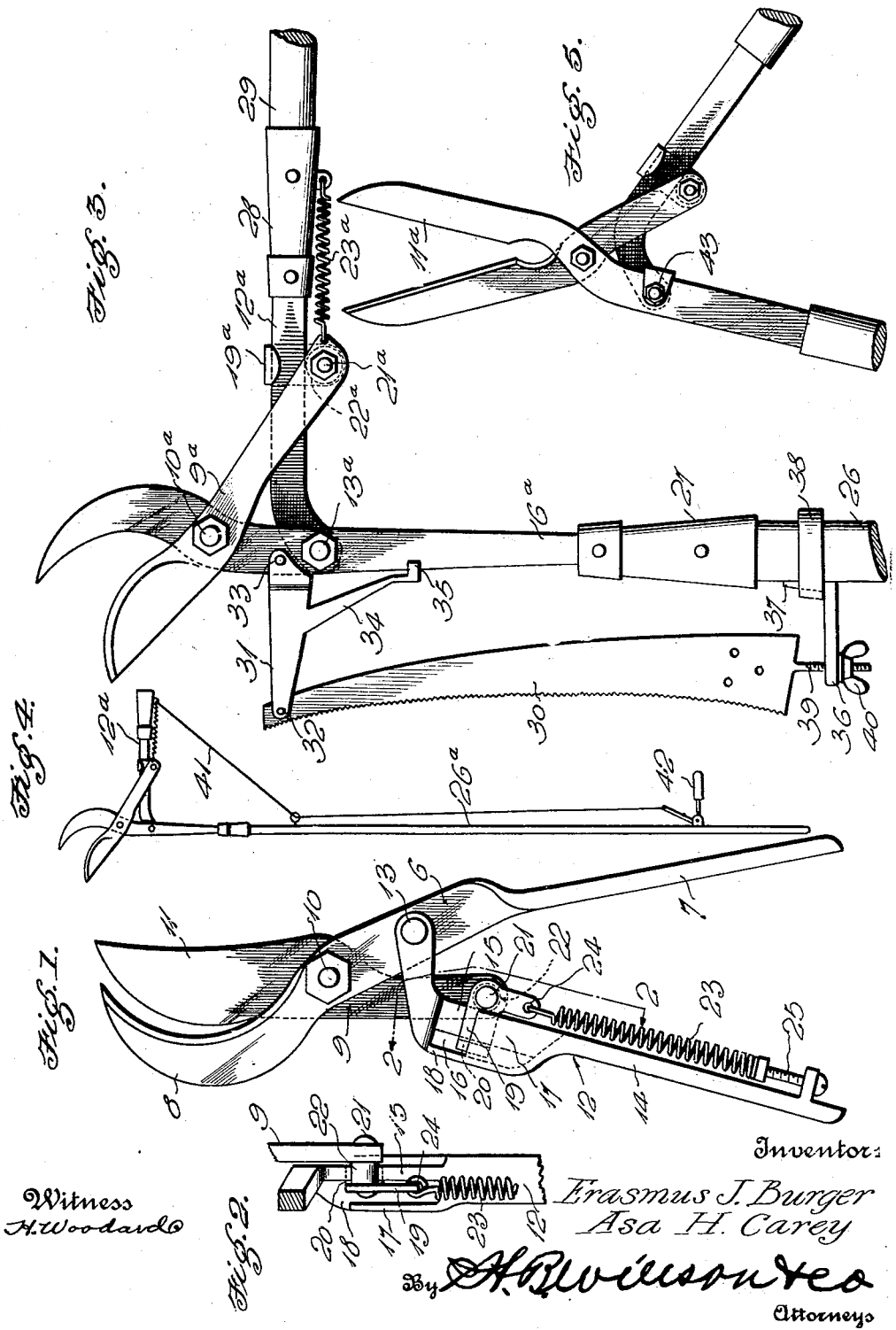
Witness
H. Woodard
Inventors
Erasmus J. Burger
Asa H. Carey
By H. R. Wilson & Co.
Attorneys Patented May 13, 1930

1,758,781

UNITED STATES PATENT OFFICE

ERASMUS J. BURGER AND ASA H. CAREY, OF NAPA, CALIFORNIA

PRESSURE-APPLYING TOOL

Application filed January 19, 1928. Serial No. 247,914.

The invention relates to improvements in pressure-applying tools and the present disclosure thereof is directed to pruning shears and analogous shears for hedge and grass trimming, etc.

It is the principal object of the invention to provide a new and improved construction in which the leverage effected by moving two levers toward each other, is greatly multiplied to bring two jaws toward each other, whether these jaws be co-operable members of shears, pliers, or other tools.

A further object of the invention is to provide unique spring means for returning the parts to normal position after the jaws have been moved toward each other.

With the foregoing in view, the invention resides in the novel subject matter hereinafter described and claimed, description being accomplished by reference to the accompanying drawing.

Fig. 1 is a side elevation illustrating hand pruning shears constructed in accordance with our invention.
Fig. 2 is a sectional view on line 2—2 of Fig. 1.

Fig. 3 is a side elevation showing long handled pruning shears constructed in accordance with the invention and illustrating also the saw attachment.

Fig. 4 is a side elevation showing pole-type pruning shears constructed in accordance with the invention.

Fig. 5 is a side elevation illustrating the invention embodied in the form of a hedge or grass trimmer.

In the form of construction shown in Figs. 1 and 2, the numeral 6 denotes a relatively long lever having a handle portion 7 at its rear end and a jaw portion 8 at its front end, said jaw portion being the blunt edged, limb-engaging member of a pair of pruning shears, in the present disclosure. A comparatively short lever 9 is fulcrumed at 10 to the lever 6, the front end or jaw portion 11 of this lever 9 being the sharp-edged cutter of the pruning shears, in the present showing.

A third lever 12 has its front end turned laterally and fulcrumed at 13 to the lever 6, at a point spaced behind the fulcrum 10, the rear portion of this lever 12 constituting a handle 14 for movement toward and from the handle 7. Near its front end, lever 12 is provided with a thinned portion 15 having a longitudinal slot 16, and outwardly spaced from this thinned portion 15, is a guard flange 17 which is integral with the lever 12, the inner edge of said guard flange being preferably in the same plane with the inner longitudinal edge of the lever 12, and the outer edge portion of said flange being preferably integral with a widened guard portion 18 at the outer side of the slot 16. A flat slide 19 is received between the flange 17 and the opposed side of the lever portion 15, and is provided with a lateral end 20 received in the slot 16. This slide is connected by a pivote 21 with the rear extremity of the lever 9, said pivot being provided with a shoe 22 here shown in the form of a roller contacting with the inner longitudinal edge of the lever 12. A tension spring 23 is connected at one end with the slide 19, said slide preferably having a lug 24 for engagement with the spring as shown, and the other end of said spring is appropriately and adjustably connected at 25 with the rear portion of the lever 12. This spring normally holds all parts in such a position as to spread the jaws or the like 8—11. When the handles 7—14 are moved toward each other however, roller 22 travels along the inner edge of the lever 12, slide 19—20 moves longitudinally of said lever 12, and this lever comes into play to forcibly pry the lever 9 in such a manner as to greatly multiply the cutting or other pressure exerted by the jaws or the like 8—11, that is to produce a much greater pressure than can be produced with the ordinary construction, in which two crossed levers are merely pivoted together with the jaws at their front ends and handles directly carried by their rear ends.

In Fig. 3, 6ª denotes a relatively long lever corresponding to the lever 6, and 9ª denotes a comparatively short lever fulcrumed to said lever 6ª, at 10ª. The rear end of lever 6ª is connected to a wooden handle 26, by an appropriate ferrule 27, and by a similar ferrule 28, a second wooden handle 29 is connected to the rear end of a third lever 12ª, the latter being fulcrumed at 13ª to the lever 6ª, at a point spaced behind the fulcrum 10ª. Preferably, the two handle 26—29 are of about fourteen inches in length. A slide 19ª comprising a flat plate having one end inwardly turned in the form of a hook is engaged with the outer edge of the lever 12ª, and the rear end of lever 9ª is pivoted at 21ª to this slide, a roller 22ª being mounted upon the pivot to engage the inner edge of lever 12ª. 23ª denotes a tension spring for holding the parts normally in about the positions shown in Fig. 3. As the handles 26—29 move toward each other, the spring of course yields and permits lever 12ª to pry lever 9ª to operative position, producing an unusually effective cutting or similar force.

A novel saw attachment is shown in Fig. 3. 30 denotes the saw blade connected with the lever 6ª and the handle 26 at its ends, by upper and lower brackets. The upper bracket comprises an arm 31 suitably connected at its outer end with the blade 30, by appropriate means 32, the inner end of this arm being bifurcated to straddle the lever 6ª and being secured detachably to the latter by a bolt or the like 33. The upper bracket also embodies an inclined brace 34 having a U-shaped seat portion 35 at its lower end which straddles and rests against the outer edge of lever 6ª. The lower saw bracket embodies an arm 36 having a wedge-shaped foot 37 contacting with the handle 26 and held tightly against the latter by a collar 38 which surrounds both foot and handle. Arm 36 is adjustably connected with the saw 30 by a stud 39 and wing nut 40, so that by tightening this nut, the saw may be placed under the desired tension.

The saw attachment just described, may be used either in connection with the long handled pruning shears of Fig. 3 or with the pole-type pruning shears shown in Fig. 4. In this last named figure, the construction may be considered for the most part, as the same as in Fig. 3. A pole 26ª however has been substituted for the handle 26, the handle 29 has been entirely omitted, and appropriate operating means 41—42, has been connected with lever 12ª for operating it.

In Fig. 5, the construction may be considered as substantially the same as in Fig. 3 with the exception that the jaws 11ª are shaped for trimming hedges, grass, etc., there is no spring such as 23ª, and the saw attachment is of course omitted. There is also a stop 43 shown, to prevent excessive closing of the jaws and the handles.

Any form of the invention is rather simple and inexpensive, yet is efficient and exceptionally easy to operate. The details disclosed may be followed if desired, but within the scope of the invention as claimed, variations may of course be made. Obviously, when the saw attachment is removed, it may be provided with a handle for use as an ordinary pruning saw.

Attention is invited to the fact that while the structure herein disclosed shows certain relations of elements, these relations may vary somewhat and still obtain excellent results. For instance, the slide 19 and its lateral end 20 will hold the roller 22 in contact with the inner longitudinal edge of the lever 12 when either opening or closing the tool, even if portions such as 17 and 18 be omitted, as will be obvious from Figs. 3, 4 and 5. Then too, if it should be desirable to construct the tool without a slide such as 19 or 19ª, the spring 23, in addition to assisting in restoring parts to open position, insures that the roller 22 or 22ª shall follow the lever 12 or 12ª as it is opened, said roller hence remaining in operative relation with the inner longitudinal edge of said lever.

Further attention is invited to the fact that in each form of the invention, a roller such as 22 or 22ª contacts with an inwardly facing longitudinal edge of a lever such as 12 or 12ª, and a laterally bent end of a slide plate such as 19 or 19ª, contacts slidably with an outwardly facing longitudinal edge of said lever. This existing relation is obvious in most views of the drawings, but it may be further explained that in the construction shown in Fig. 1, the "outwardly facing longitudinal edge" of the lever such as 12, is constituted by the inner side wall of the slot 16.

We claim:—

1. A pressure-applying tool comprising a relatively long lever, a comparatively short lever, a fulcrum connecting said levers near their front ends, a third lever fulcrumed at its front end to said relatively long lever at a point spaced behind the first named fulcrum, said third lever having a longitudinal slot near said front end thereof and a guard flange extending across one side of said slot and outwardly spaced from the slotted portion of the lever, a slide received between said slotted lever portion and said guard flange and having a lateral portion received in said slot, a pivot connecting said slide with the rear end of said comparatively short lever, and a roller on said pivot engaging the inner edge of said third lever.

2. A pressure-applying tool comprising a relatively long lever, a comparatively short lever, and a fulcrum connecting said levers near their front ends; a third lever fulcrumed at its front end to the first named lever at a point spaced behind the first named fulcrum, said third lever having an exposed inner longitudinal edge, a shoe on the rear end of said comparatively short lever contacting with said exposed inner longitudinal edge of said third lever, whereby the latter may be utilized to pry said comparatively short lever to pressure-applying position, and a tension spring having a connection at one end with the rear end of said short lever and connected at its other end with said third lever at a point spaced behind said shoe.

3. A pressure applying tool comprising a relatively long lever, a comparatively short lever, and a fulcrum connecting said levers near their front ends; a third lever fulcrumed at its front end to the first named lever at a point spaced behind the first named fulcrum, said third lever having parallel outwardly and inwardly facing longitudinal edges, a flat slide plate at one side of said third lever, said plate having one end bent laterally and slidably engaged with said outwardly facing longitudinal edge of said third lever, a pivot connecting said slide plate with the rear end of said comparatively short lever, and a roller on said pivot engaging said inner longitudinal edge of said third lever.

In testimony whereof we have hereunto affixed our signatures.

ERASMUS J. BURGER.
ASA H. CAREY.